(12) United States Patent
Yu et al.

(10) Patent No.: US 9,097,863 B2
(45) Date of Patent: Aug. 4, 2015

(54) OPTICAL FIBER CONNECTOR

(71) Applicant: HON HAI PRECISION INDUSTRY CO., LTD., New Taipei (TW)

(72) Inventors: Tai-Cherng Yu, New Taipei (TW); Cheng-Sheng Shih, New Taipei (TW); I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/566,719

(22) Filed: Dec. 11, 2014

(65) Prior Publication Data

US 2015/0093079 A1    Apr. 2, 2015

Related U.S. Application Data

(63) Continuation of application No. 13/087,394, filed on Apr. 15, 2011, now Pat. No. 8,939,653.

(30) Foreign Application Priority Data

Dec. 14, 2010   (TW) .............................. 99143589 A

(51) Int. Cl.
*G02B 6/36* (2006.01)
*G02B 6/38* (2006.01)

(52) U.S. Cl.
CPC ............ *G02B 6/3853* (2013.01); *G02B 6/3826* (2013.01)

(58) Field of Classification Search
None
See application file for complete search history.

(56) References Cited

U.S. PATENT DOCUMENTS

| 8,491,197 | B2* | 7/2013 | Tamura et al. | 385/61 |
| 2008/0144999 | A1* | 6/2008 | Takeda et al. | 385/51 |
| 2012/0093462 | A1* | 4/2012 | Childers et al. | 385/33 |
| 2013/0266262 | A1* | 10/2013 | Nishimura et al. | 385/35 |

* cited by examiner

*Primary Examiner* — Hemang Sanghavi
(74) *Attorney, Agent, or Firm* — Novak Druce Connolly Bove + Quigg LLP

(57) ABSTRACT

An optical fiber connector includes a main body, lens portions, and optical fibers. The main body includes a first side surface and a second side surface opposite to the first side surface. The main body defines a cavity between the first and second side surfaces, and a number of accommodating holes extending through the first side surface and communicating with the cavity. The cavity includes an inner surface. The lens portions are positioned on the second side surface, and each lens portion is coaxial with a corresponding accommodating hole. A focal plane of each lens portion overlaps the inner surface. The optical fibers are fixed in the accommodating holes. An end of each optical fiber is fixed at the focal plane of a corresponding lens portion. The main body includes a bottom surface and defines a through hole in the cavity. The through hole passes through the bottom surface.

4 Claims, 4 Drawing Sheets

OPTICAL FIBER CONNECTOR

CROSS-REFERENCE TO RELATED APPLICATION

This application is a divisional application of a commonly-assigned application entitled "OPTICAL FIBER CONNECTOR", filed on Apr. 15, 2011 with application Ser. No. 13/087,394. The disclosure of the above-identified application is incorporated herein by reference.

FIELD

The present disclosure relates to an optical fiber connector.

BACKGROUND

An optical fiber connector generally includes a female connector and a male connector each having a main body, at least two optical lens portions protruding from the main body, and at least two optical fibers. The main body defines a plurality of accommodating holes, such as blind holes. Each of the at least two optical fibers is fittingly fixed in a corresponding blind hole for optically coupling with a corresponding lens portion.

Mold cores for forming the accommodating holes are usually thin and long. It is difficult to precisely fabricate the blind hole using injection molding. Each lens portion must be precisely coaxial with the corresponding optical fiber to avoid transmission loss.

BRIEF DESCRIPTION OF THE DRAWINGS

Implementations of the present technology will now be described, by way of example only, with reference to the attached figures.

DETAILED DESCRIPTION

Figure 1:
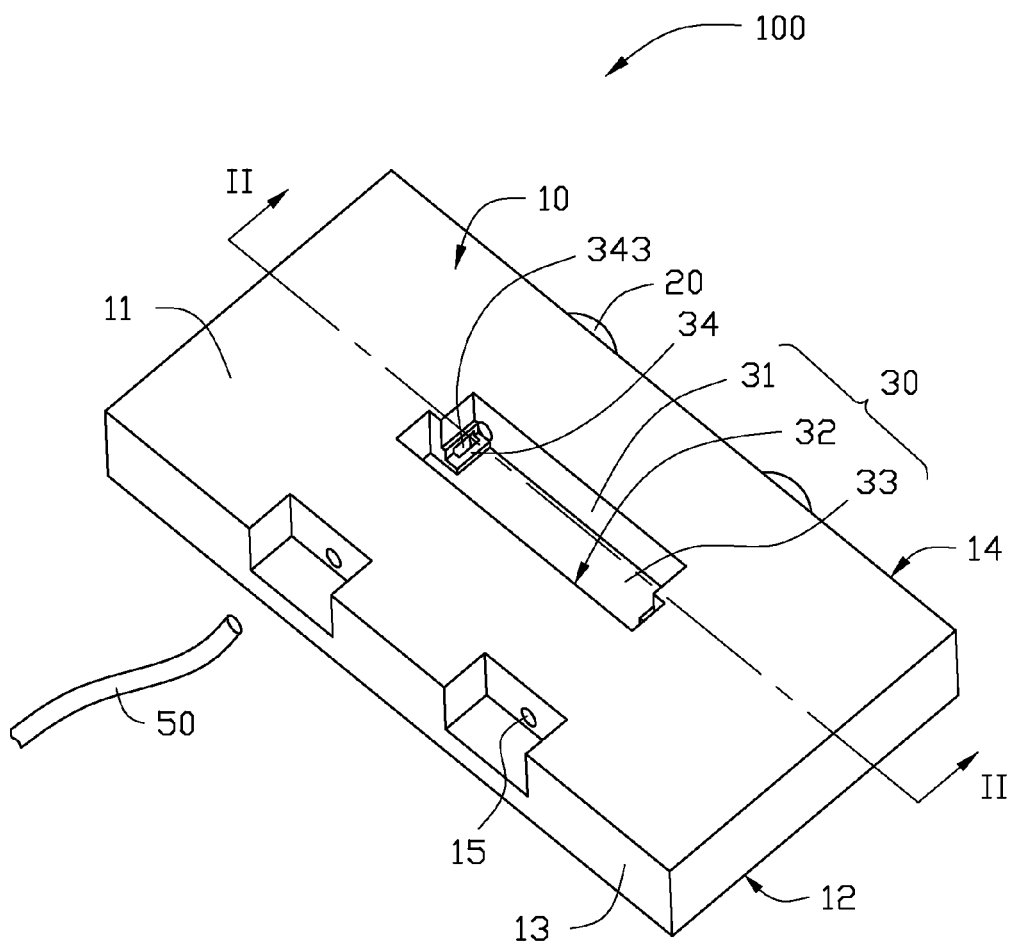
FIG. 1 shows an isometric, disassembled view of an optical fiber connector according to a first exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to mean essentially conforming to the particular dimension, shape, or other feature that is modified such that exactness does not apply. For example, substantially cylindrical means that the object resembles a cylinder, but can have one or more deviations from a true cylinder. The term "comprising," means "including, but not necessarily limited to" and specifically indicates open-ended inclusion or membership in the so-described combination, group, series and the like. The references "a plurality of" and "a number of" mean "at least two."

The present disclosure is described in relation to an optical fiber connector. The optical fiber connector includes a main body, lens portions, and optical fibers. The main body includes a first side surface and a second side surface opposite to the first side surface. The main body defines a cavity between the first and second side surfaces, and a number of accommodating holes extending through the first side surface and communicating with the cavity. The cavity includes an inner surface. The lens portions are positioned on the second side surface, and each lens portion is coaxial with a corresponding accommodating hole. A focal plane of each lens portion overlaps the inner surface. The optical fibers are fixed in the accommodating holes. An end of each optical fiber contacts the inner surface such that each optical fiber is optically coaxial with a corresponding lens portion. The main body further includes a bottom surface and further defines a through hole in the cavity. The through hole passes through the bottom surface.

Figure 2:
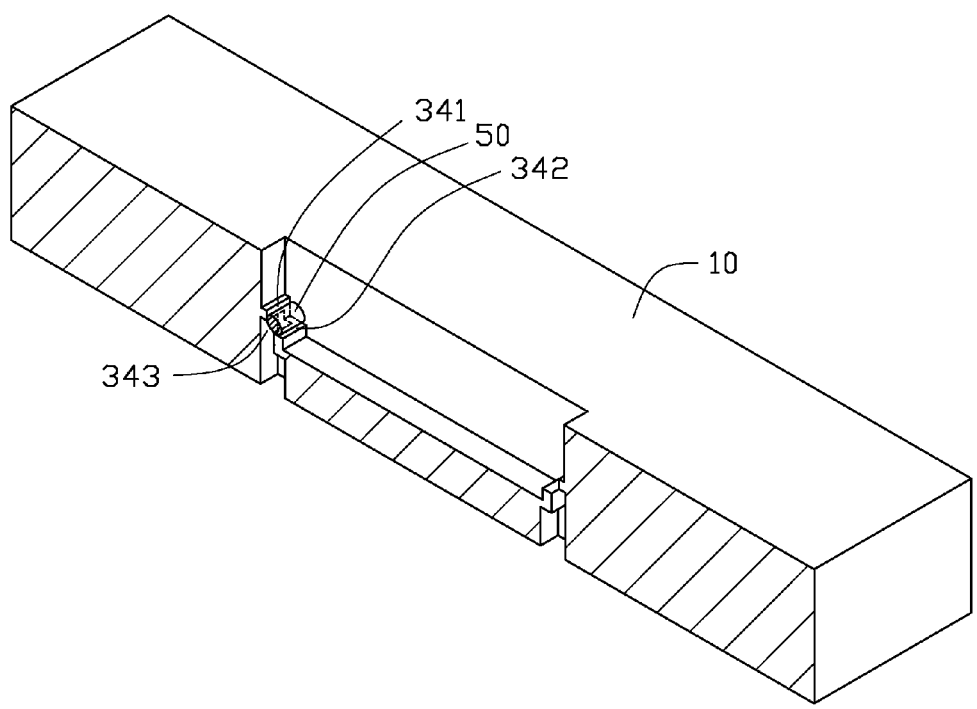
FIG. 2 shows a cross-sectional, isometric view of the optical fiber connector, taken along line II-II of FIG. 1.

FIGS. 1 and 2 illustrate that an exemplary embodiment of an optical fiber connector 100 can include a transparent main body 10, two lens portions 20, two restricting members 34, and optical fibers 50.

The main body 10 is substantially rectangular, and includes a top surface 11, a bottom surface 12, a first side surface 13 and a second side surface 14 opposite to the first side surface 13. In addition, the main body 10 defines a cavity 30 from the top surface 11 toward an inner portion, thereby obtaining a first inner surface 31, a second inner surface 32, and a third inner surface 33 in the cavity 30. The first inner surface 31 is substantially parallel to the second side surface 14, and opposite to the second inner surface 32. The second inner surface 32 is substantially parallel to the first side surface 13. The third inner surface 33 is substantially parallel to the bottom surface 12 and interconnects the first inner surface 31 and the second inner surface 32. The main body 10 further defines two accommodating holes 15, each extending through the first side surface 13 and the second inner surface 32. The accommodating holes 15 communicate with the cavity 30 and are parallel to each other. In other embodiments, the main body 10 defines more accommodating holes 15.

Each lens portion 20 protrudes from the second side surface 14, and is coaxial with the corresponding accommodating hole 15. A focal plane of the lens portion 20 overlaps the first inner surface 31. In alternate embodiments, the first inner surface 31 is spaced from and parallel to the focal plane.

The two restricting members 34 are mounted on the third inner surface 33 with an end of each one contacting the first inner surface 31. Each restricting member 34 is aligned with a corresponding accommodating hole 15, and includes a first restricting surface 341 and a second restricting surface 342 intersecting with the first restricting surface 341 at a right angle. Additionally, the first and second restricting surfaces 341, 342 are each perpendicular to the first inner surface 31. A through hole 343 is defined extending through the bottom surface 12 and the second restricting surface 342 for subsequent assembly convenience. In another embodiment, the restricting members 34 are formed in one piece with the main body 10, and the first restricting surface 341 intersects the second restricting surface 342 at an acute angle. In yet another embodiment, the restricting members 34 are omitted, and the end of the optical fibers are directly restricted by the first inner surface 31.

The optical fiber 50 is accommodated in the accommodating hole 15, an end portion of the fiber 50 is fixed on the second restricting surface 342 of the corresponding restricting member 34 and contacts the first inner surface 31. Due to the first inner surface 31 overlapping the focal plane of the lens portion 20, the optical fiber 50 is precisely positioned at the focal plane of the lens portion 20. Furthermore, due to existence of the cavity 30, shorter mold cores can be employed for fabricating the accommodating holes 15, resulting in more precise fabrication.

In assembly, the end portion of the optical fiber 50 can be first fixed on the second restricting surface 342 by a vacuum suction force produced in the through hole 343, and then adhered to the restricting member 34 with solidifying glue. In the present embodiment, the glue is curable by ultraviolet light.

Figure 3:
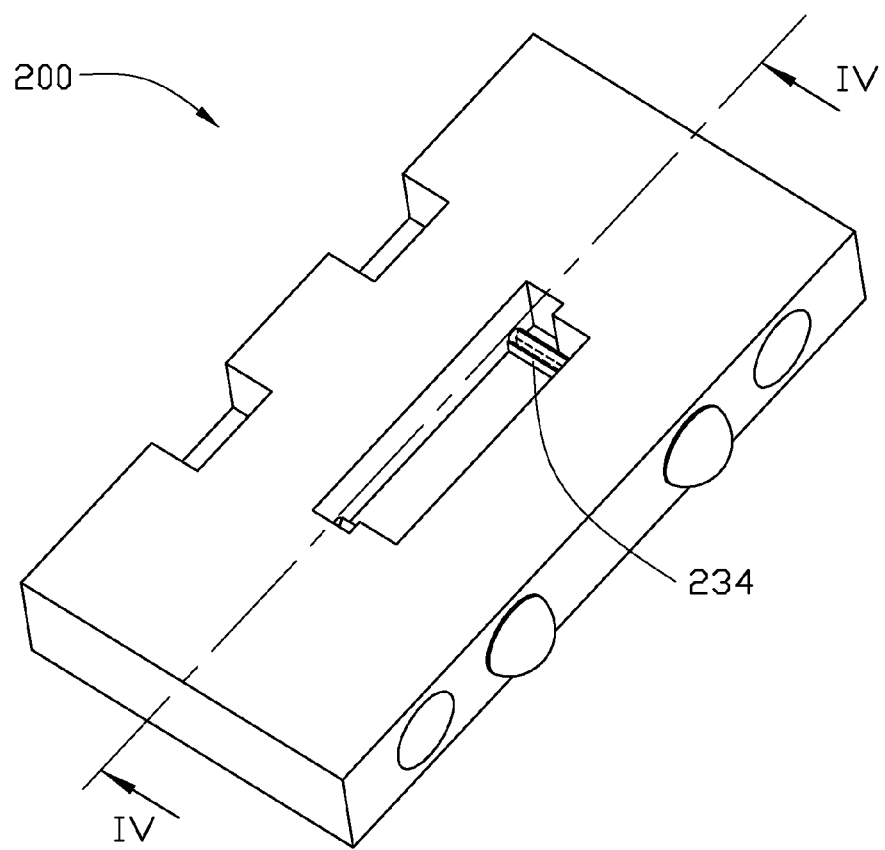
FIG. 3 shows an isometric, disassembled view of an optical fiber connector according to a second exemplary embodiment of the present disclosure.
Figure 4:
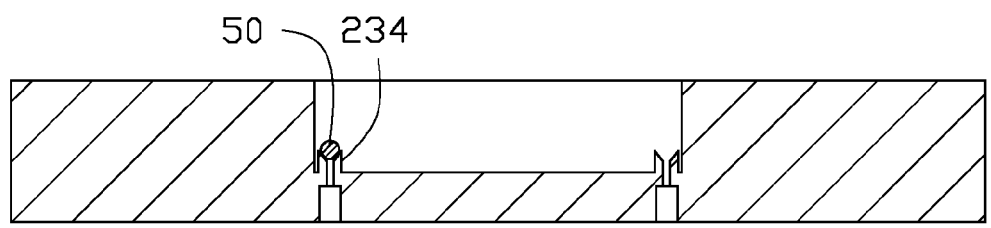
FIG. 4 shows a cross-sectional, assembled view of the optical fiber connector, taken along line IV-IV of FIG. 3.

FIGS. 3 and 4 illustrate a second exemplary embodiment of an optical fiber connector 200. The difference between the optical fiber connector 200 of the second embodiment and the optical fiber connector 100 of the first embodiment is the restricting member 234 has a substantially V-shaped section along radial direction of the optical fiber 50.

The embodiments shown and described above are only examples. Many details are often found in the art such as the other features of an optical fiber connector. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical fiber connector comprising:
a main body comprising a first side surface and a second side surface opposite to the first side surface, the main body defining a cavity between the first and second side surfaces and a plurality of accommodating holes, each accommodating hole extending through the first side surface and communicating with the cavity, the cavity comprising an inner surface;
a plurality of lens portions positioned on the second side surface, each lens portion coaxial with a corresponding accommodating holes, a focal plane of each lens portion overlapping the inner surface; and
a plurality of optical fibers fixed in the accommodating holes, an end of each optical fiber contacting the inner surface such that each optical fiber is optically coaxial with a corresponding lens portion; wherein the main body further comprises a bottom surface interconnecting with the first and second side surfaces and further defines a plurality of through holes in the cavity, the through holes pass through the bottom surface.

2. The optical fiber connector of claim 1, wherein the cavity is filled with solidifiable glue.

3. The optical fiber connector of claim 1, further comprising a plurality of restricting members arranged in the cavity, wherein each optical fiber is supported on a corresponding restricting member, and each of through holes passes through a corresponding restricting member.

4. The optical fiber connector of claim 3, wherein the restricting member has a substantially V-shaped section along radial direction of the optical fiber.

* * * * *